(12) United States Patent
Mesri et al.

(10) Patent No.: US 10,408,971 B2
(45) Date of Patent: Sep. 10, 2019

(54) METHOD OF CONSTRUCTING AN OPTIMIZED MESH FOR RESERVOIR SIMULATION IN A SUBTERRANEAN FORMATION

(71) Applicant: IFP Energies nouvelles, Rueil-Malmaison (FR)

(72) Inventors: Youssef Mesri, Rueil-Malmaison (FR); Olivier Ricois, Carrieres sur Seine (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 564 days.

(21) Appl. No.: 14/662,613

(22) Filed: Mar. 19, 2015

(65) Prior Publication Data
US 2015/0323701 A1  Nov. 12, 2015

(30) Foreign Application Priority Data
Mar. 25, 2014 (FR) ...................................... 14 52480

(51) Int. Cl.
*G06F 17/10* (2006.01)
*G01V 99/00* (2009.01)
*E21B 43/00* (2006.01)
*E21B 49/00* (2006.01)

(52) U.S. Cl.
CPC ............ *G01V 99/005* (2013.01); *E21B 43/00* (2013.01); *E21B 49/00* (2013.01); *G06F 17/10* (2013.01)

(58) Field of Classification Search
CPC ....... G01V 99/005; E21B 43/00; E21B 49/00; G06F 17/10

USPC ............................................................ 703/2
See application file for complete search history.

(56) References Cited

U.S. PATENT DOCUMENTS

| | | | |
|---|---|---|---|
| 2012/0010865 A1* | 1/2012 | Benson ................ | G01V 11/00 703/10 |
| 2013/0204588 A1* | 8/2013 | Copeland ............. | E21B 43/26 703/2 |
| 2015/0066460 A1* | 3/2015 | Klinger ............... | G06F 17/5018 703/2 |

OTHER PUBLICATIONS

Soleng et al. (Gridding for Petroleum Reservoir Sinnilation, 2001 (10 pages)).*
K.H. Coats, L.K. Thomas, R.G. Pierson, "Compositional and black oil reservoir simulation", SPE Reservoir Evaluation and Engineering, 1998.

(Continued)

*Primary Examiner* — Andre Pierre Louis
(74) *Attorney, Agent, or Firm* — Fitch, Even, Tabin & Flannery LLP

(57) ABSTRACT

The invention is a method of constructing an optimized mesh for reservoir simulation in a subterranean formation useful for exploration in exploitation of oil deposits. At an instant T of the reservoir simulation, a size function is estimated, characterizing the initial mesh representative of the subterranean formation being studied. Next the flow of the fluids within the formation at this instant T is simulated by use of a reservoir simulator and of the initial mesh. An optimized size function is thereafter computed by use of the size function estimated on the initial mesh and of at least one parameter deduced from the reservoir simulation. And finally, an optimized mesh is constructed by modifying the initial mesh as a function of the optimized size function.

22 Claims, 4 Drawing Sheets
(3 of 4 Drawing Sheet(s) Filed in Color)

(56) References Cited

OTHER PUBLICATIONS

R. Garimella and M. Shephard, Boundary layer meshing for viscous flows in complex domains, 7th International Meshing Roundtable, pp. 107-118, 1998.
H. Borouchaki and P.-J. Frey, Adaptive triangular-quadrilateral mesh generation, Int. j. numer. methods eng., vol. 41, pp. 915-934, 1998.
D. Li and B. Beckner, Optimal Uplayering for scaleup of multi-million cell geologic models. SPE paper 62927, 2000.
A. Tarn and D. Ait-Ali-Yahia and M. Robichaud and M. Moore and V. Kozel and W. Habashi, Anisotropic mesh adaptation for 3D flows on structured and unstructured grids, Computer Methods in Applied Mechanics and Engineering, pp. 1205-1230, 2001.
R. Verfurth, A review of a posteriori error estimation and adaptive mesh-refinement techniques, Wiley-Teubner, 1996.

\* cited by examiner

METHOD OF CONSTRUCTING AN OPTIMIZED MESH FOR RESERVOIR SIMULATION IN A SUBTERRANEAN FORMATION

CROSS REFERENCE TO RELATED APPLICATION

Reference is made to French Application Serial No. 14/52.480, filed Mar. 25, 2014, which application is incorporated herein by reference in its entirety.

BACKGROUND OF THE INVENTION

Field of the Invention

The present invention relates to oil exploration and more particularly, to exploration and exploitation of oil reservoirs or geological gas storage sites.

Description of the Prior Art

The study of an oil field requires the construction of a representation of the subterranean formation under study, which is also called a geological model in the broad sense or else a geomodel. These models, which are well known and widely used in the oil industry, make it possible to determine numerous technical parameters relating to the search for, study or exploitation of a reservoir, of hydrocarbons for example. Thus, a geological model has to be representative of the structure of a reservoir as well as of its behavior. This type of mockup of the subsoil is usually represented on a computer, by a mesh or grid, generally three-dimensional, each mesh cell is characterized by one or more petrophysical properties (facies, porosity, permeability, saturation, etc).

This mesh can be used to carry out numerical simulations such as basin modeling, reservoir simulation and/or the simulation of CO2 injection, simulations aimed at improving the understanding of an oil field or a geological gas storage site.

Reservoir simulation studies the temporal evolution of the proportions of water, gas and oil in a reservoir, so as to assess its profitability, or else to validate or to optimize the position of the wells with a view to its exploitation. Reservoir simulation is based on the simulation of flow in a porous medium. A flow simulator for its part is a software making it possible, inter alia, to model the production of a deposit as a function of time. These simulations are carried out by solving a system of partial differential equations representative of the flows, using for example finite volume procedures applied to a meshed representation of the subterranean medium under study. Generally, during a reservoir simulation experiment, the reservoir engineer defines a duration over which to simulate the flows in the formation of interest. Next, these equations are solved by a numerical scheme, time-step after time-step, wherein the size of the time-step (which can be a function or a constant) is intrinsically related to the numerical scheme chosen, so as to guarantee the stability of this numerical scheme. The result of a reservoir simulation is in particular a succession of instantaneous shots (like images taken at various instants) representative of the state of flow of the fluids in the formation being studied. Because of the unwieldiness of the computations involved, reservoir simulation is a technique considered at the present time to consume a great deal of computation time and memory.

The following documents are cited in the course of the description:
K. H. Coats, L. K. Thomas, R. G. Pierson, "Compositional and Black Oil Reservoir Simulation", SPE Reservoir Evaluation and Engineering, 1998.
R. Garimella and M. Shephard, Boundary Layer Meshing for Viscous Flows in Complex Domains, 7th International Meshing Roundtable, pp. 107-118, 1998.
H. Borouchaki and P.-J. Frey, Adaptive Quadrilateral Mesh Generation, Int. j. Numer. Methods Eng., Vol. 41, pp. 915-934, 1998.
D. Li and B. Beckner, Optimal Uplayering for Scaleup of Multi-million Cell Geologic Models. SPE paper 62927, 2000.
A. Tam and D. Ait-Ali-Yahia and M. Robichaud and M. Moore and V. Kozel and W. Habashi, Anisotropic Mesh Adaptation for 3D flows on Structured and Unstructured Grids, Computer Methods in Applied Mechanics and Engineering, pp. 1205-1230, 2001.
R. Verfurth, A Review of a Posteriori Error Estimation and Adaptive Mesh-Refinement Techniques, Wiley-Teubner, 1996.

Because of the limits of current supercomputers (in terms of power and memory capacity), the reservoir simulation computations cannot be carried out on a grid comprising a very large number of mesh cells (the current limit is of the order of a million mesh cells). Upstream of the reservoir simulation, the reservoir engineers then carry out a step known as "upscaling" (for example Li and Beckner, 2000), or "scaling". This step constructs a coarse grid whose values in the mesh cells correspond to an average of the petrophysical properties of the geological model defined for its part on a fine scale. Such a switch from a fine grid (of the order of several tens of meters) to a coarse grid (of the order of several hundreds of meters) introduces a smoothing of the petro-physical properties of the geological model. Consequently, the contribution of the fine heterogeneities described in the geological model is not retrieved by the reservoir simulation, and the solution obtained is an approximation to the reality of the flows.

Still because of the limitations related to current computation capacity, in the case of giant oil fields such as exist in the Middle-East or else in Russia, Mexico or Venezuela, reservoir engineers divide the geological model into several sub-models, each representing a part of the subterranean formation. However, by so doing, it becomes necessary to introduce boundary conditions relating to the flowrate of fluids from one sub-model to another, and this may lead to a solution of the flow simulation which is erroneous.

Another compromise, conventionally implemented in order to reduce computation times, carries out semi-compositional simulations, that is to say simulations for which the fluid's composition and thermodynamic properties, modeled by a state equation, are approximated by a "Black-Oil" model, restricted to the three pseudo-components, namely oil, water and gas. This approximation does not allow correct appraisal of the changes of composition in the reservoir, yet which induce phenomena requiring complete tracking of each component of the fluid.

Thus, reservoir simulation is today greatly limited in these capabilities because of the maximum number of mesh cells that can be taken into account by current computation capacity.

In parallel with the techniques of reservoir engineering, procedures for dynamic and local coarsening, or derefinement, of the mesh have been developed in the domain of fluid mechanics. More precisely, these techniques are aimed at adapting the meshes, in tandem with the simulation computations, and in a space-targeted manner. The size of the problem to be solved is then considerably reduced without, however, sacrificing accuracy, and in a manner transparent to the end user. The major difficulty with these algorithms resides in the generation of the derefined mesh, in particular in the case of unstructured meshes (case of meshes based on volume elements of tetrahedron, prism, hexahedron, etc. type) and in the case of a physical property to be represented of anisotropic nature (physical property whose values vary as a function of direction). This then entails generating a sequence of coarse meshes from a fine mesh. The coarse meshes to be generated must comply with the initial 3D geometry, gradually preserve the initial heterogeneous structure, as well as the location of the points (a point of the coarse mesh must exist in the fine mesh) in order to facilitate the construction of the prolongation and restriction operators.

This problematic issue forms part of the family of problems of dynamic adaptation of destructured meshes. In the literature, there are two principal categories of mesh control and adaptation procedures which are:

Metric-free procedures which make it is possible to cite for example the mono-directional refinement procedure for obtaining stretches in opposite directions or else an extrusion from a surface mesh (for example Garimella and Shephard, 1998). These procedures lack flexibility and are confronted with problems of connections in the case of complex geometries (curved zones, surfaces).

Metric-based procedures: it has been demonstrated (Borouchaki and Frey, 1998; Tarn et al., 2001) that a mesh representation based on Riemann metrics facilitates the generation of suitably adapted, anisotropic meshes. The metric associated with the Riemann space specifies the mesh size and the directions of stretch. Consequently, a mesh which is suitably adapted and anisotropic in Euclidian space can be represented as an isotropic and unitary mesh in Riemann space. This Riemann metric-based representation of a mesh is a widespread tool for generating and adapting anisotropic meshes. It has been employed in diverse applications in 2D and 3D: simulations of PDEs (Partial Differential Equations), image processing, graphical representation, etc. This procedure is robust for processing simplicial meshes (mesh cells of triangular type in 2D and tetrahedral type in 3D) but does not apply directly with respect to hexahedral meshes, generally implicated for reservoir simulation, because of the rigidity of their structure.

SUMMARY OF THE INVENTION

The present invention is a method for constructing an optimized mesh for reservoir simulation, by dynamically, locally, and automatically adapting the mesh representative of a subterranean formation and which is used for the reservoir simulation. This method relies on the extension of the metric, namely the size function, and can be applied equally well to simplicial meshes or to hexahedral meshes.

Thus, the present invention relates to a method of constructing an optimized mesh for a reservoir simulation over time of at least one fluid within a subterranean formation, by using a reservoir model comprising a mesh with a value of at least one petro-physical property being assigned to each mesh cell of the mesh. The method comprises at least the following steps at an instant T:

a) a size function characterizing the mesh at the instant T is estimated;

b) the flow of the fluid within the formation is simulated at the instant T by use of a reservoir simulator and of the mesh;

c) an optimized size function is computed by use of the size function and of at least one parameter deduced from the simulation;

d) the optimized mesh is constructed by modifying the mesh as a function of the optimized size function.

According to a preferred mode of implementation of the invention, the reservoir simulator can be based on a complete compositional thermal model.

According to a preferred mode of implementation of the invention, the parameter can be an error indicator regarding the result of the simulation.

According to a preferred mode of implementation of the invention, the error indicator can correspond to an a posteriori error estimation of the simulation.

Preferably, the optimized mesh can be modified as a function of the size optimized function by using a local mesh optimization technique.

Advantageously, the local optimization technique can satisfy at least the following conditions:
the conservation of the conformity of the mesh; and
the improvement of the quality of the mesh.

According to a preferred mode of implementation of the invention, it is possible to add, after step d), a step e) that scales the result of the simulation at the instant T and of the values of the petro-physical property on the optimized mesh.

According to another preferred mode of implementation of the invention, the scaling can be carried out in the following manner:
locating the nodes of the optimized mesh in the mesh; and
interpolating the result of the simulator at the instant T and the values of the petro-physical property on the optimized mesh.

Advantageously, it is possible to repeat steps a) to e) until it is possible to satisfy a predefined accuracy in the result of the reservoir simulation at the instant T.

It is possible to define a method of reservoir simulation for the fluid within the formation for a succession of instants T, implementing the method of constructing an optimized mesh for a reservoir simulation according to the invention, in which it is possible to repeat steps a) to e) for a succession of consecutive instants T of the simulation wherein the simulation at an instant T+1 is able to be carried out on the mesh optimized at the instant T.

Preferably, the succession of instants T can correspond to a succession of time-steps of the simulation.

Furthermore, the invention relates to a computer program product downloadable from a communication network and/or recorded on a medium readable by computer and/or executable by a processor, comprising program code instructions for the implementation of the method according to the description hereinabove, when the program is executed on a computer.

It is possible to define a method for exploiting a subterranean formation by carrying out the following steps:
carrying out a reservoir simulation by use of the method of reservoir simulation for the fluid within the formation described hereinabove;
determining an optimal exploitation scheme for the reservoir on the basis of the result of the reservoir simulation; and
exploiting the reservoir by implementing the optimal exploitation scheme.

The patent or application file contains at least one drawing executed in color. Copies of this patent or patent application publication with color drawing(s) will be provided by the Office upon request and payment of the necessary fee.

BRIEF DESCRIPTION OF THE DRAWINGS

Other characteristics and advantages of the method according to the invention will become apparent on reading the description hereinafter of nonlimiting exemplary embodiments, while referring to the appended figures described hereinafter.

DETAILED DESCRIPTION OF THE INVENTION

Figure 1:
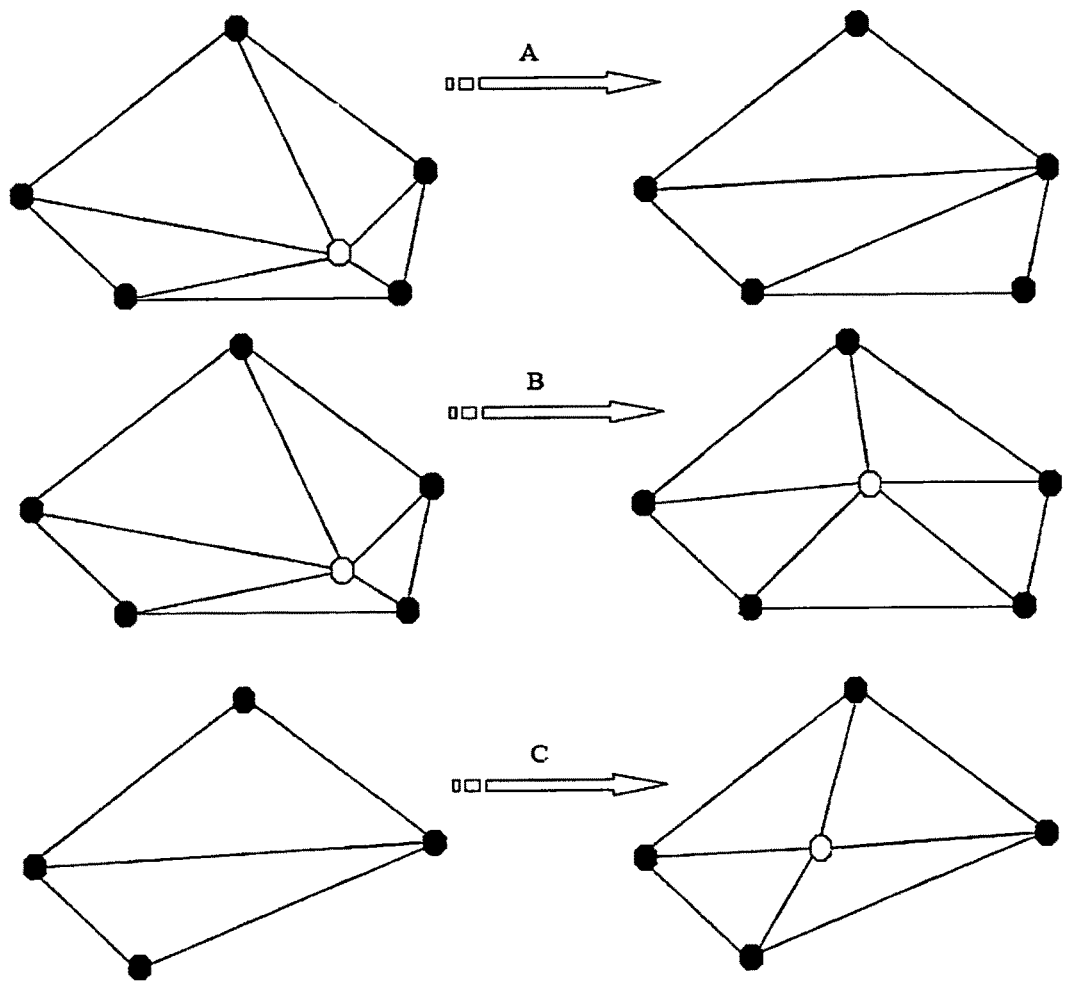
FIG. 1 presents various adaptation operations that can be carried out on a 2D cavity, such as the deletion of a node (arrow A), the displacement of a node (arrow B), or else the addition of a node (arrow C).

The following definitions are used in the course of the description of the invention:

complete compositional thermal model: this is a model making it possible to solve and to track the flux of the individual hydrocarbon species in the oil and gas phases, while taking into account the effects caused by the high-speed gases such as the non-Darcian fluxes in the environs of wells.

metric: This is a mathematical function which defines the distance between the elements of a set. A set endowed with a distance is called a metric space.

size function: This is a discrete function on a finite set, associating with each element of this set a measurable magnitude h, which is the size of this element.

refinement/derefinement of a mesh: This is the action of reducing/enlarging the size of the mesh cells of a mesh.

conformal mesh: This is a mesh for which the intersection of any two elements is either empty or is a face of the mesh (vertex, edge, triangular or quadrilateral face).

cavity associated with a node: This is the set of mesh cells, at least one edge of which is incident at the node considered.

The present invention is a method of constructing an optimized mesh, in an automatic manner and at an instant T, for simulating the flows within a subterranean formation, implementing a local and automatic mesh adaptation strategy. An instant T can be a predefined time of the simulation. The implementation of the invention makes it necessary to have a reservoir model of the subterranean formation being studied with the reservoir model being represented in the form of a mesh such that a value of at least one petro-physical property is assigned to each mesh cell of this mesh. This mesh can be characterized by a representation in layers with the geological layers being able to be of arbitrary geometries and intersected by one or more faults. The mesh can be structured or unstructured and the geometry of the mesh cells of the mesh can be arbitrary. The invention requires a simulator of the flows of the fluids in a subterranean formation which is also termed a reservoir simulator. The present invention is based on the estimation of a size function, and then a strategy for adapting this size function is implemented to impose optimal mesh cell sizes, locally and in the various directions in space.

Thus, for a given instant T and for a given mesh, which will be called the current mesh hereinafter, the present invention comprises at least the following steps:
 a) estimation of a size function;
 b) reservoir simulation at an instant T;
 c) estimation of an optimized size function; and
 d) construction of an optimized mesh.

According to one mode of implementation of the invention, after step d), a step e) is added consisting of a scaling of the result of the reservoir simulator at the instant T and of the petro-physical properties on the optimized mesh.

According to another embodiment of the present invention, steps a) to e) are repeated for a succession of instants T with the simulation at an instant T+1 being carried out on the mesh optimized at the instant T.

According to a preferred mode of implementation of the invention, a reservoir simulation is carried out according to the previous embodiment.

According to a preferential embodiment of the invention, the series of instants T corresponds to the series of time-steps of the reservoir simulation.

The principal steps of the present invention are detailed hereinafter.

Estimation of a Size Function

This step entails defining a size function characterizing the current mesh, used to represent the reservoir model of the subterranean formation being studied at the instant T. In particular, it entails characterizing the size and the stretch of each of the mesh cells of the current mesh.

According to one mode of implementation of the invention, the size function h of a mesh cell M is defined in a local frame described by the principal directions associated with this mesh cell. In the case of a three-dimensional mesh cell M, the size function h may be written in the following manner:

$h(M) = h_1 \vec{e}_1 + h_2 \vec{e}_2 + h_3 \vec{e}_3$, where $\vec{e}_i$ corresponds to the unit vector in the principal direction i of the mesh cell M and $h_i$ corresponds to the length of the edge of the mesh cell M in the principal direction i (with i=1 to 3).

Reservoir Simulation at an Instant T

In the course of this step, a solution of the simulation of the flow is computed, at an instant T, on the basis of the current mesh and of a flow simulator. For example, the PumaFlow® software (IFP Energies nouvelles, France) is a flow simulator for porous media the succession of whose computations is executed on a computer.

The degree of realism of the solution of the reservoir simulation is in part dependent on the flow model on which the flow simulator relies. The choice of one model with respect to another depends on the characteristics of the reservoir, the nature of the fluids present in the reservoir, and the exploitation method being used. The models considered in the literature are generally the monophasic model, the Black-Oil model, the compositional model, the chemical model, the thermal model or the cracked model.

According to a preferred embodiment of the present invention, the flow simulator uses a complete compositional thermal model (see for example Coats et al., 1998). A nonlinear system of strongly coupled nonlinear partial differential equations is then solved. This system represents the transient change of the fluid compositions (that is to say the saturation) and the pressure in each mesh cell. The saturation in each mesh cell may change because of fluid motions related to a potential gradient, a composition gradient, to edge effects (injector and/or producer wells), or else to effects of pressure variations due to the compressibility of the rock. A nonlinear conservation equation is solved for each hydrocarbon component. The distribution of each of these components in the gas or in the liquid phases is governed by a thermodynamic equilibrium, which is solved as a coupled system together with the flow equations. Convergence is obtained by an iterative Newton-Raphson algorithm, using a Jacobian matrix derived from the discretized nonlinear equations. Each Newton-Raphson iteration invokes an iterative linear solver which must be capable of managing an arbitrary number of unknowns per mesh cell.

Estimation of an Optimized Size Function

This step entails determining a size function optimized on the basis of the size function characterizing the current mesh and estimated during the step of "Estimation of a size function" and of at least one parameter characteristic of the reservoir simulation result computed in the step of "Reservoir simulation at an instant T". More precisely, the objective of this step is to determine a new size and a new geometry of the mesh cells of the current mesh. This determination is governed by at least one parameter deduced from the result of the reservoir simulation.

According to one embodiment of the present invention, at least one of the parameters characteristic of the result of the reservoir simulation is the preferential direction of the fluid flows in the subterranean formation under study.

According to another embodiment of the present invention, at least one of the parameters characteristic of the result of the reservoir simulation is an error indicator regarding the result of the reservoir simulation. Thus, for this embodiment, at least one of the parameters used is a rating of the quality of the result of the reservoir simulation carried out on the current mesh.

According to one embodiment of the present invention, the error indicator corresponds to an error estimator.

According to a preferred embodiment of the invention, an error indicator is constructed on the basis of an a-posteriori error estimation carried out during the computation of the reservoir simulation at the instant T. A-posteriori error estimation is an important area of study (see for example Verfurth, 1996), aimed at estimating the propagation of the errors associated with a process, on the basis of an estimation of the errors in the input data of this process and of the error engendered by the process itself.

In the case where the equations governing the flow of the fluids are discretized by the finite element procedure, according to one embodiment of the invention, an error estimator with residual basis (Verfurth, 1996) is used. An example of such an error estimator is given by the following equation:

$$E(M)=\|q\|_{L_2(V(M))}\cdot|V(M)|^{1/2}+\|u\|_{L_2(\partial V(M))}\cdot=\partial V(M)|^{1/2} \quad (1)$$

where the first term corresponds to the volumetric flowrate in the mesh cell M, the second term measures the flux across the boundaries of the mesh cell M, q is an injection flowrate in the case of an injection well or a production flowrate in the case of a production flowrate, u is the discrete solution of the flow equations for the fluids, V(M) is the volume of the mesh cell, ∂V(M) is the area of the boundary of the mesh cell i, $L^2(V(M))$ is the $L^2$ norm over the volume of the mesh cell M, and $L^2(\partial V(M))$ is the $L^2$ norm over the surface of the mesh cell M.

In contradistinction to the finite element procedure, the finite volume procedure guarantees local conservation. In this case, it may be considered that the source term of equation (1) is contained in the flux term. In the case where the equations governing the flow of the fluids are discretized by the finite volume procedure, according to an embodiment of the invention, an error estimator is given by the reduced expression:

$$E(M)=\|q\|_{L_2(V(M))}\cdot|V(M)|^{1/2} \quad (2)$$

According to one embodiment of the invention in which the parameter characteristic of the result of the simulation which is used corresponds to an a posteriori estimation of the error, the user defines beforehand a threshold of acceptable error in the result of the reservoir simulation. Next the value of the estimated error in the result of the reservoir simulation for each node of the current mesh is compared with this predefined error threshold. The nodes with an estimation of the error less than that defined by the user are identified to undergo a derefinement step. Indeed, these nodes are then considered to form part of zones of the subterranean formation under study that are inactive or not very active with respect to the reservoir simulation. Moreover, the nodes associated with an error estimation greater than the predefined threshold are identified to undergo a refinement step. In this manner, the mesh adaptation process makes it possible to equi-distribute the computed error. Moreover, the mesh adaptation thus defined makes it possible to automatically detect the behavior of the flow of fluids in the subterranean formation and to take into account the anisotropy of the physical phenomena.

According to one embodiment of the invention, the candidate mesh cells for derefinement or else for refinement are determined by computing an adaptability index of each mesh cell of the current mesh. According to one embodiment of the present invention, an adaptability index for a mesh cell M forming part of a set of mesh cells $\mathfrak{M}$ is given by the following equation:

$$I(M)=\frac{E(M)}{\max_{\mathfrak{M}} E(M)} \quad (3)$$

where E(M) is an error estimator for the mesh cell M, computed for example with the aid of equations (1) or (2) defined previously. According to one embodiment of the present invention, the values of this adaptability index for each mesh cell M are examined in the following manner:

if $I(M) \geq \delta_1$, the mesh cell M is a candidate for derefinement;

if $I(M) \geq \delta_2$ the mesh cell M is a candidate for refinement, where $\delta_1$ and $\delta_2$ are tolerance thresholds lying between 0 and 1 with $\delta_1 > \delta_2$.

According to one embodiment of the present invention in which at least one parameter characteristic of the result of the reservoir simulation is an error indicator, the conversion of this indicator into an optimized size function h' is done in an explicit manner by specifying a coefficient Copt that is applied to the size function h established on the current mesh in the following manner:

$$h'(M)=Copt \cdot h(M) \quad (4)$$

with

Copt=Cr if the mesh cell M is a candidate for refinement, Cr being a refinement coefficient;

Copt=Cd if the mesh cell M is a candidate for derefinement, Cd being a derefinement coefficient.

According to one embodiment of the invention, predefined values are used for the coefficients Cr and/or Cd.

According to one embodiment of the invention, the values of the coefficients Cr and/or Cd vary according to the direction considered, or stated otherwise, the coefficients Cr and/or Cd are anisotropic.

According to one embodiment of the present invention, the construction of the optimized size function takes moreover into account external constraints such as the location of the wells, the constraint gradients, the variation of the properties of the material, the points of application of the load, or else the location of the boundary conditions.

Construction of an Optimized Mesh

In the course of this step, a new mesh, termed the optimized mesh, is constructed, based on the optimized size function estimated during the step of "Estimation of an optimized size function".

According to one embodiment of the invention, the optimization of the mesh is carried out by using the current mesh, of the optimized size function, and of a mesh generator.

According to one embodiment of the present invention, the mesh generator re-meshes the current mesh by a local mesh optimization technique. The optimization technique is locally re-meshing cavities, having small clusters of mesh cells, so as to increase the quality of the mesh cells of this cluster. FIG. 1 presents various adaptation operations that can be carried out on a 2D cavity, such as the deletion of a node (arrow A), the displacement of a node (arrow B), or else the addition of a node (arrow C).

According to one embodiment of the present invention, the re-meshing process satisfies at least the following conditions:

the conformity of the mesh is safeguarded. If the current mesh is conformal, no overlap of mesh cells is acceptable for the optimized mesh. Consequently, from among all the possible mesh solutions, the one (not necessarily unique) which minimizes the volume of the cavity is chosen;

the geometric quality of the mesh is improved. If the solution of the previous criterion is not unique, this second criterion selects from among all the admissible solutions the one which improves the quality of the mesh.

According to one mode of implementation of the invention, the quality of a mesh is improved if, for each node N of this mesh, the quality of the cavity associated with this node N is improved.

According to one embodiment of the present invention, the quality Q(C) of a cavity C associated with a node N corresponds to the average value of the qualities of the mesh cells incident at this node.

According to one embodiment of the present invention, the quality of a mesh cell M is estimated according to the following formula:

$$Q(M) = c_0 \frac{V(M)}{L(M)^d} \quad (5)$$

where V(M) is the volume of the mesh cell M, L(M) is the average of the lengths of edges of M, d is the dimension of the space (d=1 in 1D, d=2 in 2D, d=3 in 3D) and co is such that the above expression is equal to 1 when the mesh cell M is a regular polyhedron (for example a cube).

According to one embodiment of the present invention, the quality of a mesh cell M is computed in the local frame of the mesh cell with the frame being composed of the principal axes of the size function associated with the mesh cell M.

According to one mode of implementation of the invention, the improvement of the quality of a mesh is achieved by applying the following algorithm for each node N of this mesh:

i. The quality function Q(C) of the cavity C associated with the node N is computed;

ii. The edges incident at the node N are deleted;

iii. The node N is connected to edges of the boundary of the cavity C to construct a new cavity C' around N;

iv. The quality Q'(C') of the new cavity C' is evaluated; and v. If Q'(C')>Q(C) then the cavity C' is retained or otherwise return to step iii to define a new cavity.

Scaling on the Optimized Mesh

This step, which will be denoted e) subsequently, is optional and can be added after having determined an optimized mesh according to the step of "Construction of an optimized mesh" described hereinabove. This step scales the known physical quantities and/or simulated on the current mesh to the scale of the optimized mesh.

According to one embodiment, the optimized mesh determined at an instant T is used to continue the flow computations in the subterranean formation at an instant T+1 with recourse being had to interpolate on the optimized mesh:

the result of the reservoir simulation computed at an instant T on the current mesh;

the values of the petro-physical properties known on the current mesh.

According to one embodiment of the present invention in which an optimization loop is carried out on the mesh at a given instant T, recourse is had to such a step so as to interpolate on the optimized mesh:

the result of the reservoir simulation is computed at the instant T on the current mesh; and the values of the petro-physical properties are known on the current mesh.

According to one embodiment of the present invention, a first step is carried out in which a search is conducted for the location of each of the nodes of the optimized mesh, by identifying the cells of the current mesh containing them, then a second step is carried out of interpolation of the known physical quantities on the current mesh. These two steps are detailed hereinafter:

i. Location of the Nodes

The problem of locating a node of the optimized mesh is in identifying the mesh cell of the current mesh which contains this node. This problem must be handled with care so as to be able to handle difficult configurations. Indeed, the meshes (current and optimized) may be non-convex and contain holes. It is even possible that the overlap of the optimized mesh might not be identical to that of the current mesh, since their boundary meshes are different. This implies that some nodes of the optimized mesh may be outside the current mesh and vice versa.

In order to begin the location process, each mesh cell of the current mesh is associated with a mesh cell of the optimized mesh. Next, for a node of the optimized mesh, a process of location in the associated current mesh is started. In the case where a boundary is encountered (because of a hole or a non-convex domain), the mesh cells neighboring the current mesh cell are analyzed.

According to one mode of implementation of the present invention, recourse is had to the location process described in (Borouchaki and Frey,1998). This process, for a given node of the optimized mesh moves around in a neighborhood in the current (oriented) mesh to find the mesh cell of the current mesh containing the node being considered by using an algorithm based on the barycentric coordinates.

ii. Interpolation Procedure

Once each node of the optimized mesh has been located in the current mesh, the interpolation of the known quantities on the current mesh is undertaken to estimate them on the optimized mesh. These quantities may be for example the result of the reservoir simulation computed at the instant T on the current mesh and/or the petro-physical properties known on the current mesh.

According to one embodiment of the invention, a conventional interpolation scheme of polynomial type of degree 1 is used.

According to a preferential embodiment of the invention in which the meshes considered are of tetrahedral type, if N a node of the optimized mesh, M equals [N1,N2,N3,N4] the tetrahedral mesh cell of the current mesh containing this node N, $M_i$ is the virtual tetrahedral mesh cell in which the vertex $N_i$ has been replaced with the vertex N (with i=1,4), then the interpolation of a function u is given by:

$$u(N) = \sum_i \omega_i(N) u(N_i) \text{ with } \omega_i(N) = V_{M_i}/V_M \quad (5)$$

with $V_M$ the volume of the mesh cell M, and $V_{M_i}$ the volume of the mesh cell $M_i$.

According to one embodiment of the present invention in which the meshes being considered are arbitrary, each polyhedron is subdivided into tetrahedrons and the mode of implementation defined hereinabove for tetrahedral meshes is applied.

Optimization of the Mesh at an Instant T

According to one embodiment of the invention, the mesh is adapted in an optimal manner at a given instant T by repeating at least the following steps
 a) estimation of a size function;
 b) reservoir simulation at an instant T;
 c) estimation of an optimized size function;
 d) construction of the optimized mesh; and
 e) scaling on the optimized mesh
until a predefined accuracy is satisfied for the result of the reservoir simulation at the instant T.

According to one embodiment of the present invention, the predefined accuracy corresponds to the error associated with the result of the reservoir simulation estimated at the first iteration of the iterative process thus described. In this way, a search is conducted for the optimized mesh whose associated error is at most equal to that made on the mesh considered on entry to the iterative process thus described.

Reservoir Simulation with Dynamic Adaptation of the Mesh

According to one embodiment of the present invention, steps a) to e) defined previously are repeated for a succession of consecutive instants T. The simulation of step b) at an instant T+1 is carried out on the mesh optimized at the instant T. Thus, a reservoir simulation is carried out on a mesh optimized at each instant T which makes it possible in particular to decrease the computation time.

According to a preferred embodiment of the invention, the consecutive instants T are spaced apart by the time-step chosen to solve the numerical scheme of the reservoir simulation. Thus, the simulation is optimized for each time-step of the reservoir simulation.

According to a preferential embodiment of the present invention, the current mesh at the first iteration corresponds to the geological model representative of the subterranean formation studied.

Exploitation of the Reservoir

Furthermore, the invention relates to a method for exploiting a subterranean formation, in which the following steps are carried out:

A reservoir simulation is carried out by use of the reservoir simulation method such as described previously;

An optimal exploitation scheme for the reservoir is determined on the basis of the result of the reservoir simulation; and The reservoir is exploited by implementing the optimal exploitation scheme.

On the basis of a reservoir simulation according to the invention, several exploitation schemes can be determined corresponding to various possible configurations for exploiting the subterranean reservoir including location of the producer and/or injector wells, target values for the flowrates per well and/or for the reservoir, the type of tools used, the fluids used, injected and/or recovered, etc. For each of these schemes, it is appropriate to determine their production forecasts. These probabilistic production forecasts can be obtained by use of the reservoir simulation according to the invention.

On the basis of the probabilistic production forecasts defined for each exploitation scheme, a comparison can choose the exploitation scheme which seems to be the most relevant. For example:

By comparing the maximum of the volume of oil recovered, it is possible to determine the production scheme liable to provide the maximum recovery or to be the most profitable; and By comparing the standard deviation of the volume of oil recovered, it is possible to determine the least risky production scheme.

The reservoir is then exploited according to the exploitation scheme defined for example by drilling new wells (producers or injectors), by modifying the tools used, by modifying the flowrates and/or the nature of fluids injected, etc.

The invention relates, moreover, to a computer program product downloadable from a communication network and/or recorded on a medium readable by computer and/or executable by a processor. This program comprises program code instructions for the implementation of the method as described hereinabove, when the program is executed on a computer.

Examples of Application

Figure 2A:
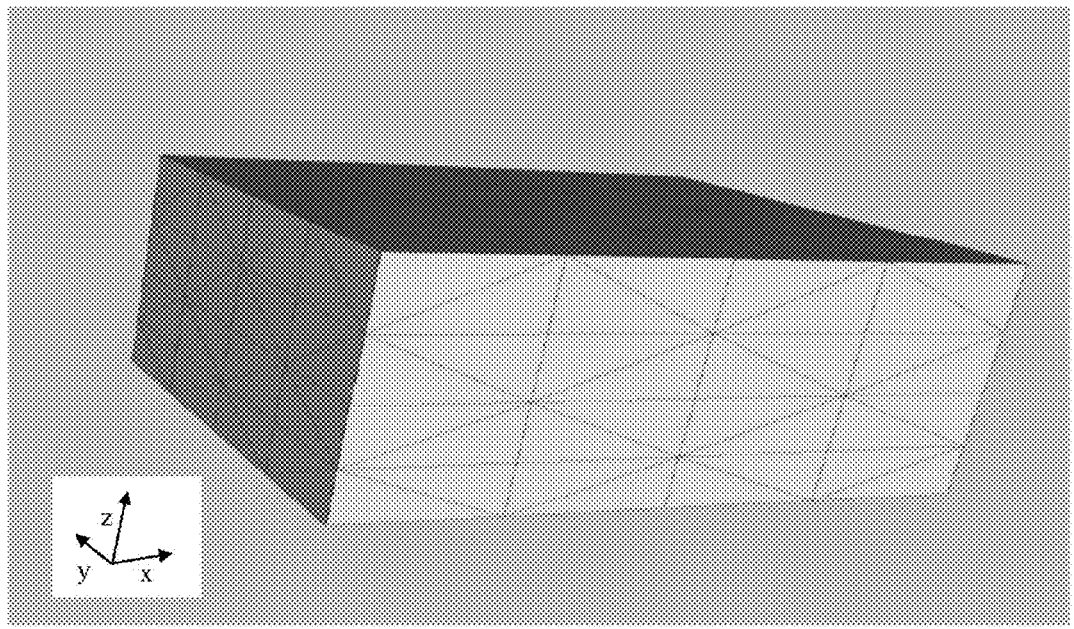
FIGS. 2A and 2B present an exemplary tetrahedral mesh respectively before and after anisotropic derefinement in the vertical direction.
Figure 2B:
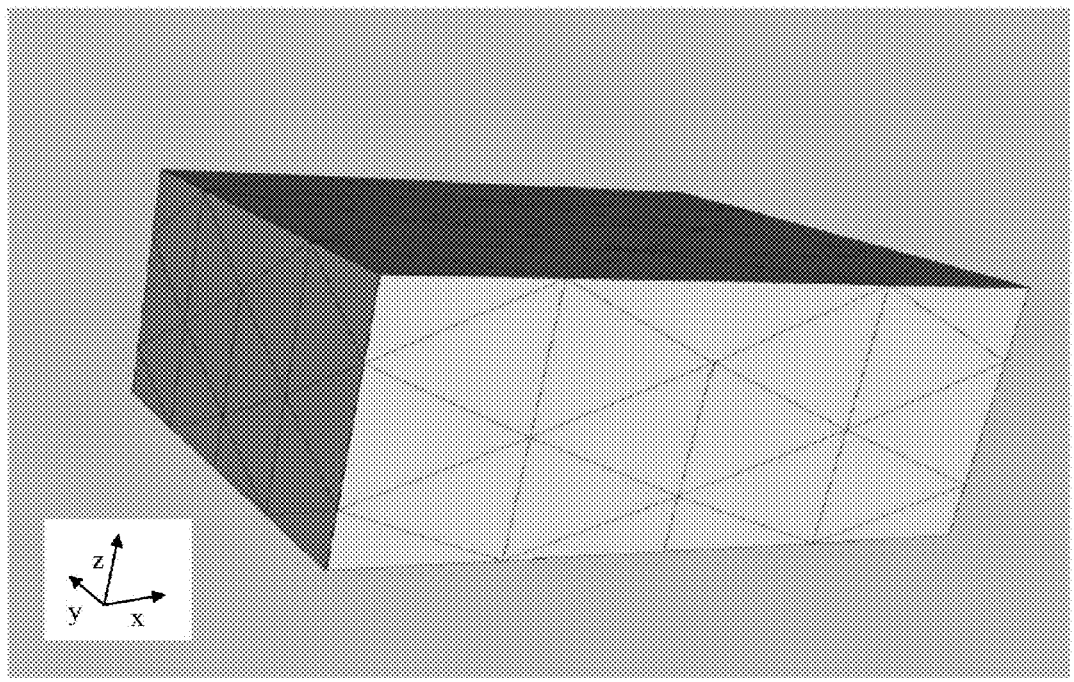

The mesh optimization method according to the invention is illustrated in FIG. 2 in the case of a three-dimensional mesh of tetrahedral type. The current mesh, presented in FIG. 2A, is composed of 27 nodes and of three layers in the vertical direction (defined along the z axis). A reservoir simulation has been carried out and has demonstrated that the fluid flows occur very predominantly in a horizontal plane (defined in accordance with the 2 axes x and y). Since significant accuracy of the petro-physical properties is not necessary in the vertical direction, it is decided to operate a derefinement in the vertical direction. More precisely, the objective is to determine, on the basis of the current mesh presented in FIG. 2A, an optimized mesh for which, firstly, the length of edges in the z direction is twice as large as that of the current mesh, and secondly, the length of edges remains unchanged in the x and y directions. On completion of the optimization method according to the invention, an isotropic optimized mesh having 18 nodes and of two layers (FIG. 2B) is obtained. Moreover, the size of the edges of the mesh cells of the optimized mesh according to the invention has indeed doubled in the vertical direction relative to that of the current mesh.

FIGS. 3A to 3D illustrate a case of applying the mesh optimization method according to the invention within the framework of a simulation of the SAGD, (Steam Assisted Gravity Drainage) thermal method. SAGD is a method of gravity drainage of a reservoir of heavy oils, using injection of steam into the reservoir to reduce the viscosity of the oils in situ. A vertical section through the 3D current mesh of such a reservoir is presented in FIG. 3A. The mesh optimization method according to the invention has been implemented using an a posteriori error estimator to establish the size function. Moreover, an adaptability indicator such as defined by equation (3) and a computation, such as defined by equation (4), of the optimized size function have been used to carry out the step of "Estimation of an optimized size function". In particular, the following values have been used:

for the tolerance thresholds associated with equation (3): $\delta_1=0.7$ and $\delta_2=0.4$; and for the refinement/derefinement coefficients associated with equation (4): $C_r=0.5$ and $C_d=2$.

Figure 3A:
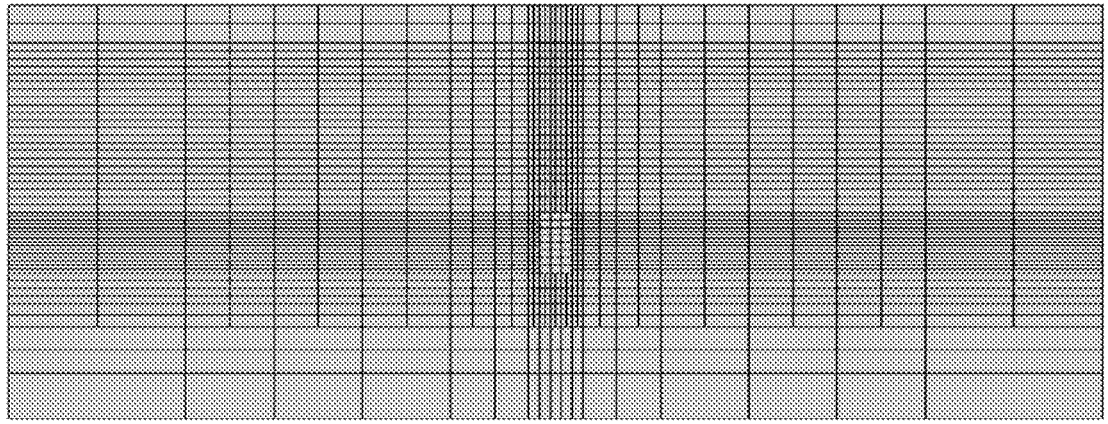
FIGS. 3A and 3B present an exemplary hexahedral 2D mesh respectively before and after non-conformal isotropic derefinement.
Figure 3B:
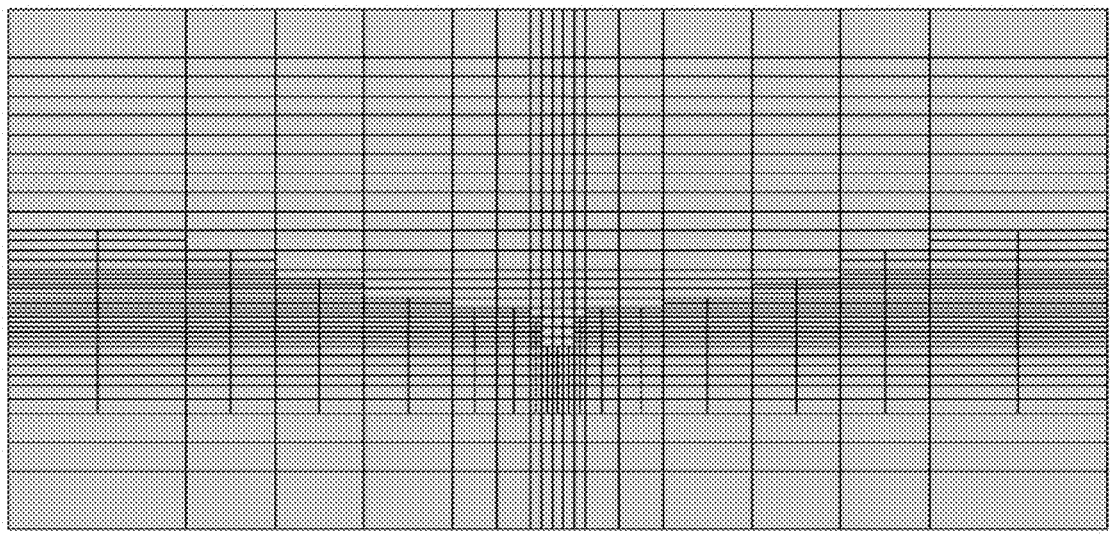
Figure 3C:
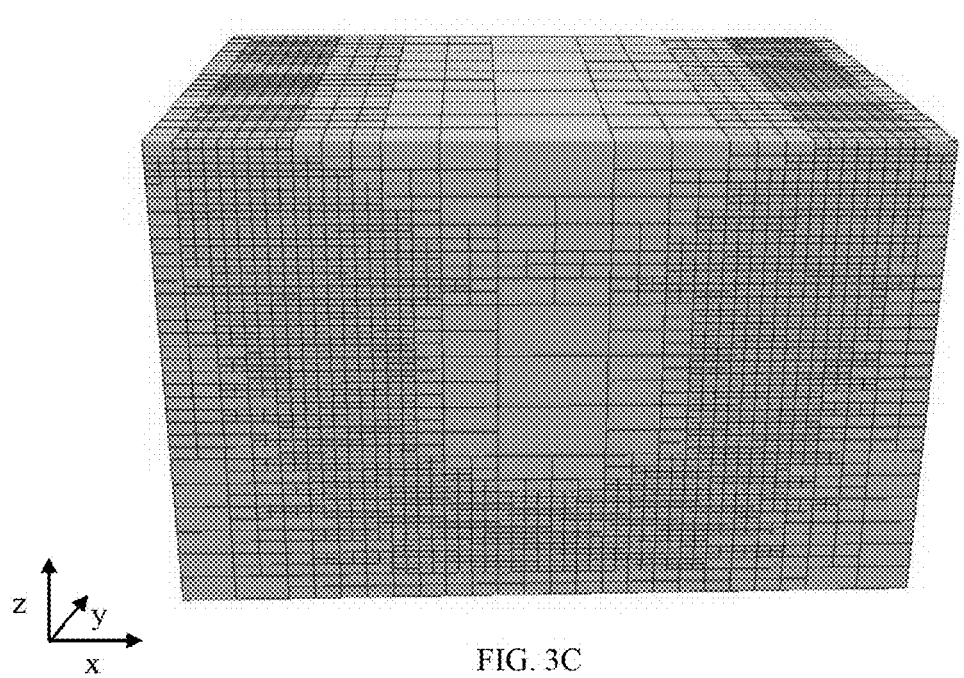
FIGS. 3C and 3D present the 3D version of the same hexahedral mesh, after derefinement, and with superposition of the steam saturation variations in FIG. 3D.
Figure 3D:
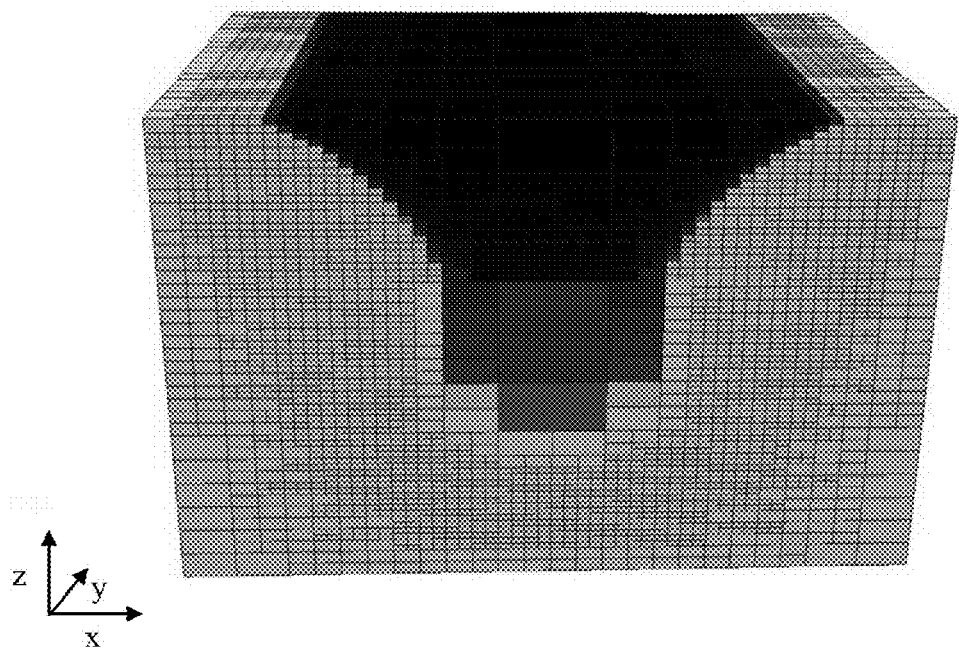

The mesh resulting from the mesh optimization process according to the invention, for the same vertical section and for the same instant T as in FIG. 3A, is presented in FIG. 3B. It may in particular be observed in this Figure that the procedure according to the invention allows local adaptation of the size of the mesh cells of the current mesh. FIGS. 3C to 3D make it possible to show that the local adaptation of the mesh is steered by the result of the reservoir simulation. FIG. 3C presents the three-dimensional mesh resulting from the implementation of the method according to the invention for a given instant T. The variations in the steam saturation rate, which are obtained by reservoir simulation at this same instant T, are overlaid on the optimized three-dimensional mesh presented in FIG. 3C, the black color corresponding to a maximum steam saturation rate. The zones of the optimized mesh according to the invention exhibiting the highest steam saturation values (dark gray to black mesh cells) therefore correspond to the zones situated after the passage of the steam front. It may thus be noted that the method according to the invention makes it possible to obtain very coarse mesh cells in the zones already traversed by the passage of the front, in contradistinction to the zones situated ahead and level with the steam front, for which the mesh is finer. Thus, the present invention makes it possible to ensure the fineness of the mesh, and a fortiori that of the petro-physical properties of interest, in the regions in which the flows are predominant at an instant T, and to redefine elsewhere.

The invention claimed is:

1. A method of exploiting a subterranean reservoir based on constructing an optimized mesh containing cells used for reservoir simulation over time of at least one fluid within a subterranean formation which reduces computation time for the reservoir simulation, by using a reservoir model implemented in a programmed computer, and comprising a first mesh of mesh cells in which a value of at least one petro-physical property is assigned to each cell of the mesh, comprising steps carried out at time instants T of:

a) estimating a first size function h (M) characterizing size and stretch of each of the mesh cells of the first mesh at time instant T of the reservoir simulation with the size function being expressed by a relationship $h(M)=h_1\vec{e}_1+h_2\cdot\vec{e}_2+h_3\vec{e}_3$, where $\vec{e}_i$ corresponds to a unit vector in a principal direction i of mesh cell M and $h_i$ corresponds to the length of the edge of the mesh cell M in the principal direction i with i=1 to 3;

b) simulating flow of the at least one fluid within the formation at the time instant T with the reservoir simulation by using the first mesh of mesh cells;

c) using a computer to compute a second size function by using of the first size function and at least one parameter obtained from the reservoir simulation at the time instant T, the at least one parameter being a preferential direction of fluid flows determined by the reservoir simulation at the time instant T;

d) constructing a second mesh by modifying the first mesh as a function of the second size function;

e) scaling a result of the reservoir simulation at the time instant T and of values of the at least one petro-physical property of the second mesh;

f) repeating steps a)-e) for a succession of consecutive time instants T of the reservoir simulation with the reservoir simulation at a time instant T+1 carried out on the second mesh at time instant T which reduces the computation time for the reservoir simulation; and g) exploiting the subterranean reservoir based on the reservoir simulation employing the second mesh.

2. A method according to claim 1, comprising basing the reservoir simulation on a compositional thermal model.

3. A method according to claim 1, wherein the at least one parameter comprises an error indicator of a result of the reservoir simulation.

4. A method according to claim 2, wherein the at least one parameter comprises an error indicator of a result of the reservoir simulation.

5. A method according to claim 1, wherein the second mesh is modified as a function of the second size function using a local mesh optimization.

6. A method according to claim 2, wherein the second mesh is modified as a function of the second size function using a local mesh optimization.

7. A method according to claim 3, wherein the second mesh is modified as a function of the second size function using a local mesh optimization.

8. A method according to claim 4, wherein the second mesh is modified as a function of the second size function using a local mesh optimization.

9. A method according to claim 5, wherein:
the local mesh optimization satisfies at least conservation of conformity of the mesh and improvement of quality of the mesh.

10. A method according to claim 6, wherein:
the local mesh optimization satisfies at least conservation of conformity of the mesh and improvement of quality of the mesh.

11. A method according to claim 7, wherein:
the local mesh optimization satisfies at least conservation of conformity of the mesh and improvement of quality of the mesh.

12. A method according to claim 8, wherein:
the local mesh optimization satisfies at least conservation of conformity of the mesh and improvement of quality of the mesh.

13. A method according to claim 1, wherein the scaling comprises steps of:
locating nodes of the optimized mesh; and
interpolating a result of the reservoir simulation at the time instant T and values of the at least one-petro-physical property on the optimized mesh.

14. A method according to claim 1, comprising:
repeating steps a) to e) until a predefined accuracy in a result of the reservoir simulation is satisfied at the instant time T.

15. A method according to claim 2, comprising:
repeating steps a) to e) until a predefined accuracy in a result of the reservoir simulation is satisfied at the instant time T.

16. A method according to claim 3, comprising:
repeating steps a) to e) until a predefined accuracy in a result of the reservoir simulation is satisfied at the instant time T.

17. A method according to claim 4, comprising:
repeating steps a) to e) until a predefined accuracy in a result of the reservoir simulation is satisfied at the instant time T.

18. A method according to claim 1, wherein the succession of consecutive time instants T of the reservoir simulation are a succession of time-steps of the reservoir simulation.

19. A method according to claim 1, wherein the at least one parameter comprises an error indicator of a result of the reservoir simulation and corresponds to a posteriori error estimation of the reservoir simulation.

20. A method in accordance with claim 1, wherein the at least one parameter comprises an error indicator of a result of the reservoir simulation and corresponds to a posteriori error estimation of the reservoir simulation.

21. A computer program product recorded on a non-transitory medium which is readable by computer or is executable by a processor, comprising stored program code instructions which, when executed performs a method of constructing an optimized mesh containing cells used for reservoir simulation over time of at least one fluid within a subterranean formation which reduces computation time for the reservoir simulation, by using a reservoir model implemented in a programmed computer, and comprising a first mesh of mesh cells in which a value of at least one petro-physical property is assigned to each cell of the mesh, comprising steps carried out at time instants T of:
  a) estimating a first size function h (M) characterizing size and stretch of the mesh cells of the first mesh at time instant T of the reservoir simulation with the size function being expressed by $h(M)=h_1\vec{e}_1+h_2\cdot\vec{e}_2+h_3\vec{e}_3$, where $\vec{e}_i$ corresponds to a unit vector in a principal direction i of mesh cell M and $h_i$ corresponds to the length of the edge of the mesh cell M in the principal direction i with i=1 to 3;
  b) simulating flow of the at least one fluid within the formation at the time instant T with the reservoir simulation by using the first mesh of mesh cells;
  c) using a computer to compute a second size function by using of the first size function and at least one parameter obtained from the reservoir simulation at the time instant T, the at least one parameter being a preferential direction of fluid flows determined by the reservoir simulation at time instant T;
  d) constructing a second mesh by modifying the first mesh as a function of the second size function;
  e) scaling a result of the reservoir simulation at the time instant T and of values of the at least one petro-physical property of the second mesh;
  f) repeating steps a)-e) for a succession of consecutive time instants T of the reservoir simulation with the reservoir simulation at a time instant T+1 carried out on the second mesh at time instant T which reduces the computation time for the reservoir simulation; and
  g) exploiting the subterranean reservoir based on the reservoir simulation employing the second mesh.

22. A computer program product in accordance with claim 21, wherein the at least one parameter comprises an error indicator of a result of the reservoir simulation and corresponds to a posteriori error estimation of the reservoir simulation.

* * * * *